United States Patent [19]

Tappert et al.

[11] Patent Number: 5,675,640
[45] Date of Patent: Oct. 7, 1997

[54] TELEPHONE RINGING SIGNAL DETECTOR

[75] Inventors: Eric William Tappert, Bucks County; Craig Brian Ziemer, Lancaster County, both of Pa.

[73] Assignee: Lucent Technologies Inc., Murray Hill, N.J.

[21] Appl. No.: 445,236

[22] Filed: May 19, 1995

[51] Int. Cl.$^6$ .............................. H04M 1/00; H04M 3/00
[52] U.S. Cl. .................. 379/373; 379/375; 379/377; 379/382
[58] Field of Search ......................... 379/373, 375, 379/377, 378, 382, 97, 106; 324/430, 431

[56] References Cited

U.S. PATENT DOCUMENTS

| | | | |
|---|---|---|---|
| 4,620,063 | 10/1986 | Todd | 79/382 |
| 4,653,093 | 3/1987 | Zofan | 379/386 |
| 4,920,561 | 4/1990 | Mitchell | 379/106 |
| 4,935,959 | 6/1990 | Markovic et al. | 379/377 |
| 5,250,904 | 10/1993 | Salander et al. | 324/431 |
| 5,361,296 | 11/1994 | Reyes et al. | 379/373 |
| 5,544,241 | 8/1996 | Dibner et al. | 379/373 |

*Primary Examiner*—Krista M. Zele
*Assistant Examiner*—Jacques M. Saint-Surin
*Attorney, Agent, or Firm*—Scott W. McLellan

[57] ABSTRACT

An integrated ringing signal detector sufficiently small for implementation on a single PCMCIA card. The detector has a DC-blocking capacitor 28 disposed between the telephone line and a bridge rectifier 27. The output 29 of the rectifier 27 connects to a voltage detector 23 which detects when the ringing signal exceeds a predetermined voltage. Output 30 of the voltage detector 23 triggers thyristor switch 24 into conduction. Switch 24 remains conductive until current flowing therein falls below the holding current of the thyristor switch 24. Current limiter 25 limits the current flowing therein to a substantially fixed predetermined amount of current, sufficient for the adequate operation of the LED in the opto-coupler transducer 22. The transducer 22 is shown here as an opto-coupler having an LED transmitter and a phototransistor receiver to provide galvanic (high-voltage) isolation between the telephone line and the utilization device, here a modem.

15 Claims, 1 Drawing Sheet

TELEPHONE RINGING SIGNAL DETECTOR

BACKGROUND OF THE INVENTION

1. Field of the Invention

This invention relates to telephone apparatus generally and, more specifically, to telephone ringing signal detectors.

2. Description of the Prior Art

Electronic equipment that interfaces to telephone lines, such as modems, answering machines, facsimile machines, etc., need to reliably detect when a call is being received. Ringing signal detectors in the equipment provide an output signal when a ringing signal is present on the telephone line. However, the telephone ringing signal voltage, duration, and frequency varies widely throughout the world. Even within the United States, the allowed ranges in voltage can vary over 50% from a nominal value of, for example, 90 $VAC_{RMS}$.

Prior art ringing detectors, such as that shown in FIG. 2, utilize a relatively physically large resistor and capacitor series combination to allow detection of the ringing signal at the minimum ringing voltage and safely dissipate excess energy at the highest ringing voltage. For example, the resistor typically has a power dissipation factor of 2 watts and the value of the capacitor is 0.47 µF, 400 volts. Unfortunately, the physical size of these components limits the ability of these circuits to be formed on small substrates, such as on an integrated circuit or on PCMCIA cards, widely used for modems for portable computers or the like. Further, at minimum ringing signal voltages, the pulse width of the output signal from prior art ringing signal detectors may be too narrow for a reliable ringing signal indication.

Thus, it is desirable to provide a circuit design that allows for reliable detection of ringing signals over a wide range of signal voltages without the need of large components for adequate power dissipation.

SUMMARY OF THE INVENTION

This aspect and others may be obtained generally from apparatus for detecting a ringing signal on a telephone line having at least two wires and coupling to a transducer. The circuit has a voltage detector coupling to the telephone line, a switch responsive to the voltage detector, and a current limiter having a substantially fixed predetermined current limit. The switch and current limiter are disposed in series with the transducer.

Alternatively, the apparatus for detecting a ringing signal has a voltage detector coupling in parallel to the telephone line, a switch which closes when the voltage detector detects a voltage exceeding a predetermined voltage, and a current limiter. The switch and current limiter are disposed in series with the transducer.

Another alternative is a method of detecting a ringing signal on a telephone line having at least two wires and coupling to a transducer, the transducer indicating to a utilization device, such as modem, the presence of the ringing signal. The method includes the steps of detecting when a signal on the telephone line exceeds a predetermined voltage, then coupling the transducer and a series-coupled current limiter to the line when the signal exceeds the predetermined voltage. The current limiter has a substantially fixed predetermined current limit.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
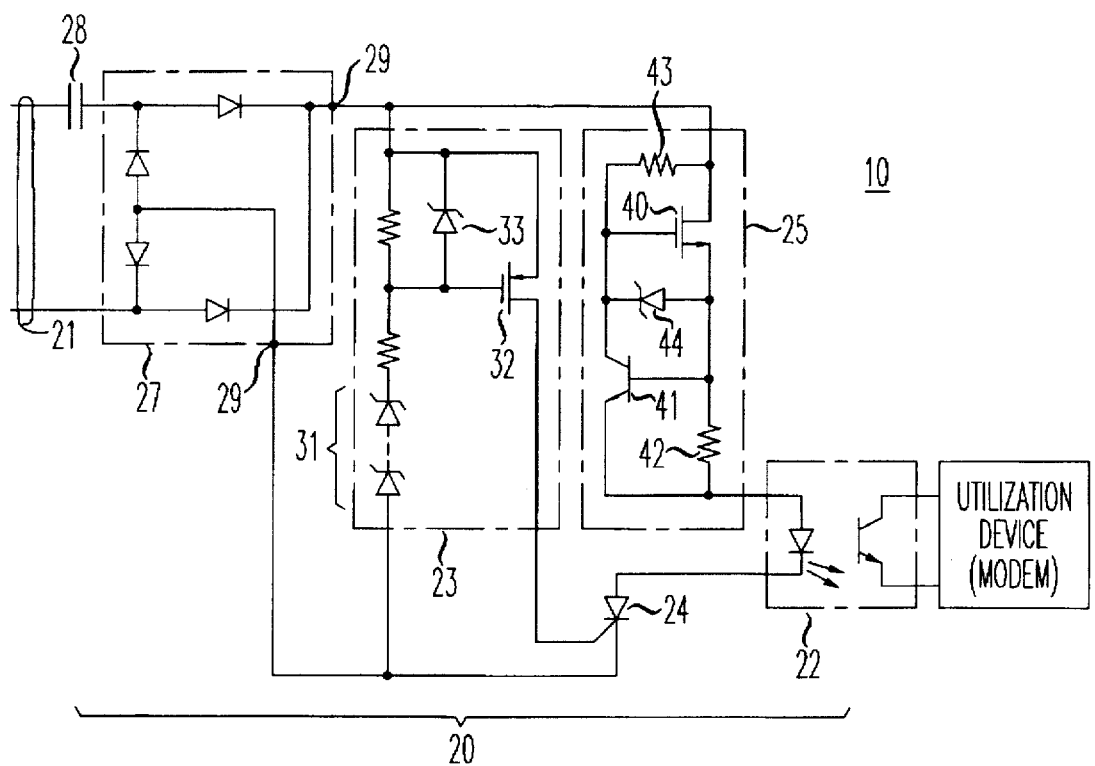
FIG. 1 is a simplified circuit diagram of an exemplary ringing detector according to one embodiment of the invention.
Figure 2:
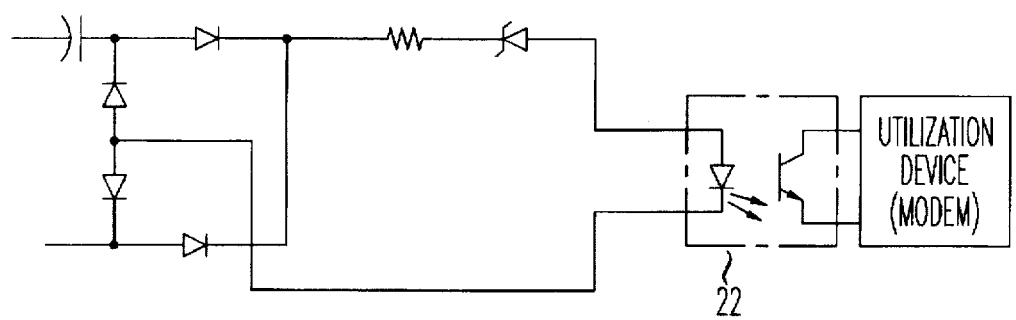
FIG. 2 is a simplified circuit diagram of a prior art ringing detector.

Turning to FIG. 1, the invention can be understood generally from the simplified circuit diagram of an exemplary embodiment of the invention. In an exemplary modem data access arrangement (DAA) application 10, the ringing signal detector 20 detects a ringing signal on a telephone line 21 having at least two wires and coupling to a transducer 22. The ringing signal detector 20 includes a a voltage detector 23 coupling to the telephone line, a thyristor switch 24, responsive to the voltage detector, and a current limiter 25. The switch 24 and current limiter 25 are disposed in series with the transducer 22. Because the voltage detector 23 and current limiter 25 are not in series as in the prior art detector, each may be independently adjusted to achieve the desired detector characteristics.

In more detail, the ringing signal detector 20 shown in FIG. 1 has a DC-blocking capacitor 28 disposed between the telephone line and a bridge rectifier 27. The rectifier can be a single diode, however the bridge arrangement advantageously allows both half-wave portions of the ringing signal to be used by the detector. The transducer 22 is shown here as an opto-coupler having an LED transmitter and a phototransistor receiver to provide galvanic (high-voltage) isolation between the telephone line and the utilization device, here a modem. It is understood that other transducers types may be used instead of or in conjunction with the opto-coupler, such as a tone ringer for audible ringing annunciation.

The outputs 29 of the rectifier 27 connects to a voltage detector 23 which detects when the ringing signal exceeds a predetermined voltage. Output 30 of the voltage detector 23 triggers thyristor switch 24 into conduction. Switch 24 remains conductive until current flowing therein fails below the holding current of the thyristor switch 24. Current limiter 25 limits the current flowing flowing therein to a predetermined substantially fixed amount of current, sufficient for the adequate operation of the LED (not numbered) in the opto-coupler transducer 22. It is normally deskable for the predetermined current be greater than the holding current of the thyristor switch 24 for latching by thyristor switch 24. It is normally deskable for switch 24 to latch so that the output signal pulse width from transducer 22 is wide enough at the minimum signal voltage for reliable ringing signal detection. However, if latching is not desired, the holding current of switch 24 may be higher than the predetermined current or the thyristor replaced with a conventional transistor switch, such as a bipolar or field-effect transistor.

The voltage detector is shown disposed across the outputs 29 of the rectifier 27 and, hence, is effectively in parallel with the telephone line. In this exemplary embodiment, desired threshold voltage for the detector is set by a series string of Zener diodes 31. Once the voltage on outputs 29 exceed the break-down voltage of the Zener string 31, P-channel field-effect transistor 32 conducts, sending current through output 30 to trigger thyristor switch 24. Zener diode 33 protects the gate of transistor 32 from damage. It is understood that other voltage detector circuits may be used, such as bandgap references, $V_{be}$ multipliers, etc., combined with a voltage comparator. Alternatively, a bipolar transistor could be used instead of the the P-channel transistor 32.

Current limiter 25 in this exemplary embodiment is a combination of an N-channel field-effect transistor 40, an NPN transistor 41 and resistors 42, 43 providing a substantially fixed (non-resistive) predetermined constant current limit. Until the predetermined current limit is reached, transistor 40 and resistor 42 carry the current through the current limiter 25. Upon sufficient current passing through resistor 42 to turn-on transistor 41, the gate of transistor 40 is reduced by conduction through transistor 41 to substantially maintain a fixed voltage drop across resistor 42 (about 0.7 volts), thereby limiting the current passing through the limiter 25. Zener diode 44 protects both transistors 40 and 41 from an overvoltage condition. It is understood that other current limiter circuit configurations are available, such as those using all bipolar or field-effect transistors, band-gap references, etc. As mentioned above, the amount of the predetermined current limit should be sufficient for reliable operation of the transducer 22.

A ringing signal detector 10 has been simulated and breadboarded. With a conventional opto-coupler transducer 22 as shown, current limiter 25 is set to provide an approximate exemplary current limit of 1 mA and the threshold voltage of the voltage detector 23 is set to 50 volts. The breadboarded detector 10 was successful in reliably detecting AC ringing signals with amplitudes of 40 to 150 volts RMS and frequency ranging from 16 to 68 Hz without appreciable heating of the detector's components at the higher voltages and signaling frequencies. Because the current limiter 25 is, for purposes here, essentially non-resistive (constant current), a small capacitor can be used for capacitor 28, here a 0.12 µF, 400 volt capacitor. As such, the size of the capacitor, ringing detector chip and transducer 22 is small enough to fit on a single PCMCIA card along with a data access arrangement (DAA) and a complete V.34 modem.

The purpose of bridge rectifier 27 is to change the AC ringing signal voltage into a pulsating DC signal (pulsing at twice the ringing signal frequency) for the voltage detector 23 and current limiter 25 to process. However, it is understood that the rectifier 27 may be removed if the voltage detector 23, current limiter 25, transducer 22 and switch 24 operate with bipolar signals. Given the above description of the preferred embodiment of the invention, one with ordinary skill in the art could accomplished this by modifying limiter 25 and detector 23 to respond to bipolar signals, with the switch 24 implemented as a triac (or other bidirectional conducting switch) and opto-coupler transducer 22 having two anti-parallel LEDs to respond to bipolar currents.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

The invention claimed is:

1. An apparatus for detecting a ringing signal on a telephone line, having a transducer for indicating the presence of the ringing signal, CHARACTERIZED BY:

a voltage threshold detector coupling to the telephone line;

a switch, responsive to the voltage threshold detector; and a current limiter having a substantially fixed predetermined current limit;

wherein the switch and current limiter are combined in series with the transducer and couple to the telephone line.

2. The apparatus of claim 1, wherein the voltage threshold detector is in parallel with the telephone line.

3. The apparatus of claim 2, wherein the switch latches when closed until current flowing therein is less than the predetermined amount.

4. The apparatus of claim 3, wherein the switch is a thyristor.

5. The apparatus of claim 4, wherein the transducer is an LED in an opto-coupler, the opto-coupler further coupling to a modem or the like and providing galvanic isolation.

6. The apparatus of claim 5, further comprising a DC-blocking capacitor and a rectifier, disposed between the telephone line and the combination of the voltage detector, current limiter and transducer.

7. An apparatus for detecting a ringing signal on a telephone line having, a transducer for indicating the presence of the ringing, CHARACTERIZED BY:

a voltage threshold detector coupling in parallel to the telephone line;

a switch, the switch closing when the voltage threshold detector detects a voltage exceeding a predetermined voltage; and a current limiter;

wherein the switch and current limiter are disposed in series with the transducer and couple to the telephone line.

8. The apparatus of claim 7, wherein the current limiter has a substantially fixed predetermined current limit.

9. The apparatus of claim 8, wherein the switch latches when closed until current flowing therein is less than a predetermined amount.

10. The apparatus of claim 9, wherein the switch is a thyristor.

11. The apparatus of claim 10, wherein the transducer is an LED in an opto-coupler, the opto-coupler further coupling to a modem or the like and providing galvanic isolation.

12. The apparatus of claim 11, further comprising a DC-blocking capacitor and a rectifier, disposed between the telephone line and the combination of the voltage threshold detector, current limiter and transducer combination.

13. An apparatus for detecting a ringing signal on a telephone line having, a transducer for indicating the presence of the ringing, CHARACTERIZED BY:

a rectifier coupling to the telephone line, having an output;

a DC-blocking capacitor disposed between the rectifier and the telephone line;

a voltage threshold detector coupling to the output of the rectifier;

a thyristor, the thyristor triggering when the voltage threshold detector detects a voltage exceeding a predetermined voltage threshold; and a current limiter having a substantially fixed predetermined current limit;

wherein the thyristor and current limiter are disposed in series with the transducer and couple to the telephone line.

14. The apparatus of claim 13, wherein the transducer is an LED in an opto-coupler.

15. In a modem or the like, a method of detecting a ringing signal on a telephone line having at least two wires and coupling to a transducer, the transducer indicating to the modem the presence of a ringing signal, CHARACTERIZED BY THE STEPS OF:

detecting when a signal on the telephone line exceeds a predetermined voltage;

coupling the transducer and a series current limiter to the telephone line when the signal exceeds the predetermined voltage;

wherein the current limiter has a substantially fixed predetermined current limit.

* * * * *